United States Patent [19]

Bonacorsi et al.

[11] Patent Number: 4,995,421

[45] Date of Patent: Feb. 26, 1991

[54] LOCK-OUT VALVE WITH CONTROLLED RESTART

[75] Inventors: Dennis L. Bonacorsi, Howell; Donald E. McGeachy, Milford; Alan L. Smith, Livonia, all of Mich.

[73] Assignee: Numatics, Incorporated, Highland, Mich.

[21] Appl. No.: 462,591

[22] Filed: Jan. 9, 1990

Related U.S. Application Data

[63] Continuation-in-part of Ser. No. 405,964, Sep. 12, 1989, abandoned.

[51] Int. Cl.$^5$ .................... F15B 13/04; F15B 13/01
[52] U.S. Cl. .................... 137/383; 137/625.69; 251/222; 251/224
[58] Field of Search ............ 70/180; 137/383, 625.69; 251/222, 224

[56] References Cited

U.S. PATENT DOCUMENTS 3,880,178  4/1975  Panissidi .................... 251/48 X Primary Examiner—Gerald A. Michalsky
Attorney, Agent, or Firm—Barnes, Kisselle, Raisch, Choate, Whittemore & Hulbert

[57] ABSTRACT

A lock-out valve is designed to direct pressure fluid to an operational port and system, and to exhaust such pressure for purposes of repair or reconstruction of a valve controlled system. The valve may be quickly moved to the exhaust phase by a manual stroke overriding threads between two concentric parts. However, reverse motion of the valve to re-establish pressure to the operational port can only be accomplished by a turning action on the manual actuator. This insures a slow return of pressure to the system and a slow start up so that the controlled system can be safely and properly reset. The thread design is such that the motion in one direction will override the threads but prevent reverse action except by turning.

6 Claims, 3 Drawing Sheets

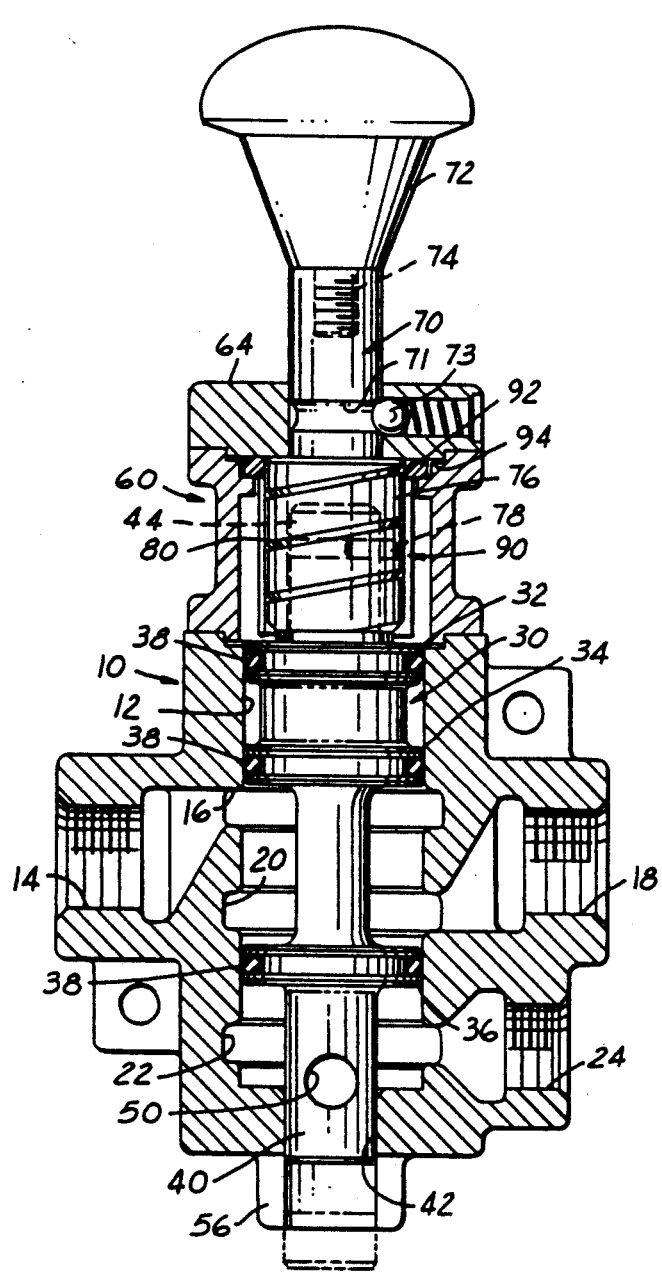
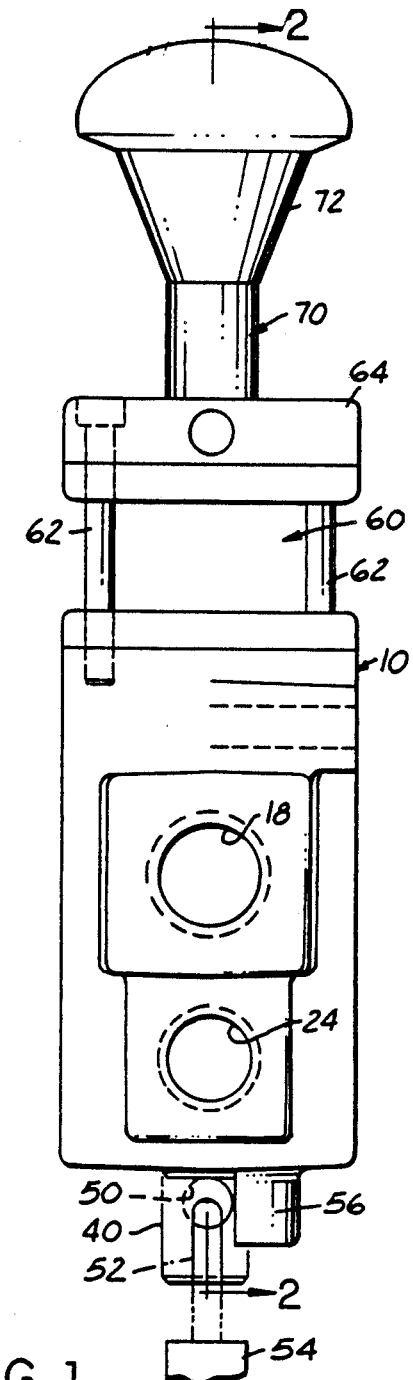
FIG. 2
FIG. 1

LOCK-OUT VALVE WITH CONTROLLED RESTART

REFERENCE TO RELATED APPLICATION

This application is a continuation-in-part of copending application Ser. No. 07/405,964 filed Sept. 12, 1989, now abandoned.

FIELD OF INVENTION

Air-controlled machinery with lockable shut-off valve to permit repair in safety to avoid unexpected or an accidental restart of the machinery.

BACKGROUND AND FEATURES OF THE INVENTION

In manufacturing processes and general industry activities, many machines are operated by air cylinders and air control valves which direct air to the cylinders. These air cylinders may be power operated in one direction with gravity or spring return, or may be power operated in each direction. On some occasions, it is necessary to stop the machines for repairs. Under these circumstances, it is important that a master control valve or other valves be closed to cut off air supply. It is not uncommon to lock these valves in the "off" position with a padlock so that no accidental start-up can occur while the particular machine is being worked on.

The present invention is directed to a lock-out shut-off valve which can be manually operated to a shut-off position and locked with the passage of a padlock link through the valve shaft. The invention is further directed to a shut-off valve which when released from the lock-out position will control the restart pressure in a manner to prevent a sudden charge of air to the cylinders of the machine. In some cases, the shut down may have caused some cylinders to move from an end position or to retract entirely and a slow reset is desirable to avoid injury or accidents.

Additional features and objectives of the invention will be apparent in the following description and claims in which the principles of the invention are set forth together with details to enable persons skilled in the art to practice the invention, all in connection with the best mode presently contemplated for the invention.

BRIEF DESCRIPTION OF THE DRAWINGS

DRAWINGS accompany the disclosure and the various views thereof may be briefly described as:

FIG. 1, a side elevation of the lock-out valve.

FIG. 2, a sectional view of the valve housing, the valve spool and the actuator taken on line 2—2 of FIG. 1.

DETAILED DESCRIPTION OF THE INVENTION AND THE MANNER AND PROCESS OF USING IT

Figure 3:
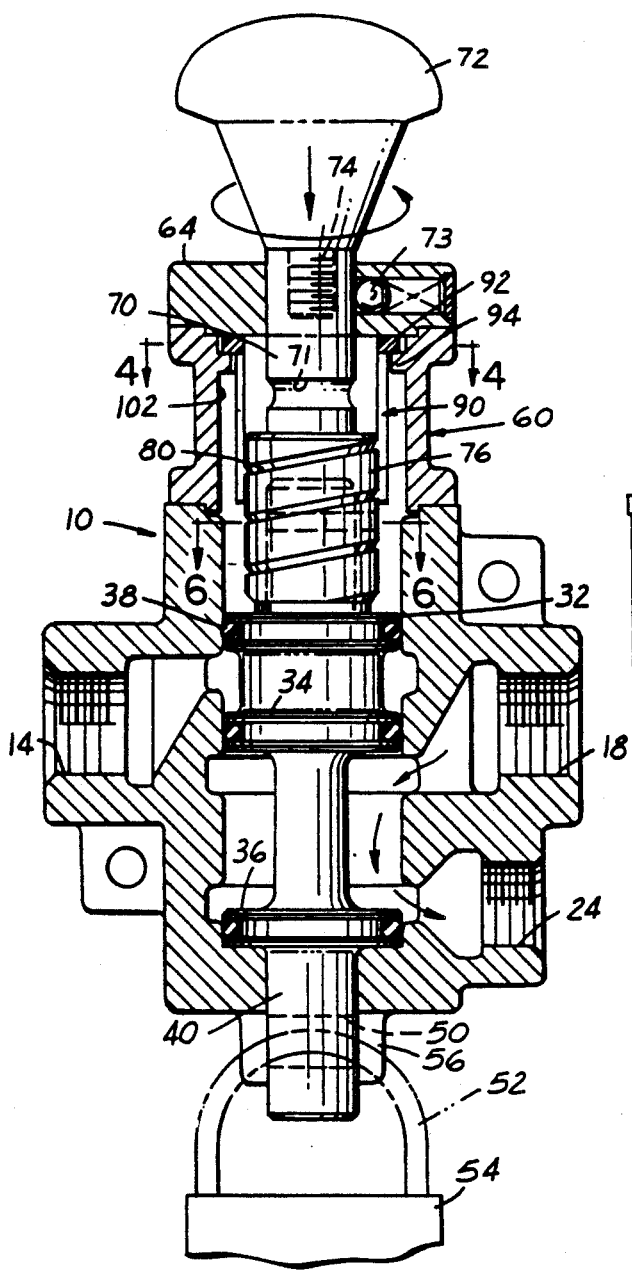
FIG. 3, a sectional view of the valve assembly with the valve spool in lock position.

In FIGS. 1 and 2, a main valve housing 10 has a central opening 12, and on one side, a side pressure port 14 leading to an annular groove 16. On the other side is an operational outlet or cylinder port 18 leading to a second annular port groove 20 spaced from port groove 16. Below the operational port groove 20 is an exhaust port groove 22 connected to an exhaust side port 24 in housing 10.

Within the central opening 12 of the housing 10 is a valve spool 30 having three lands 32, 34, and 36, each with a groove for receiving a sealing ring 38. The valve spool 30 has a small projection 40 at the lower end to have a sliding fit in an opening 42 in the bottom of the housing 10. Also at the top end of the valve spool is a projection stud 44 later to be referenced.

The lands 32, 34 and 36 are spaced on the spool 30 such that in the position of the spool shown in FIG. 2, a passage is clear between ports 14 and 18 sealed by lands 34 and 36. Land 32 is not functioning in this position. In FIG. 3, the spool has been shifted downwardly to a bottom position in which the upper spool 32 seals the upper portion of the body, and passages 18 and 24 are connected between lands 34 and 36. In this position the lower projection 40, which has a cross bore 50, is in a position where the shackle 52 of a padlock 54 can pass through the bore 50 as shown in FIG. 3 to prevent upward motion of the valve spool. A stud protrusion 56 on the lower end of housing 10 adjacent opening 42 orients the padlock relative to the valve spool and housing, and prevents potential damage to the internal thread 110 (FIG. 5, to be described below) by improper rotation of the knob 72.

Figure 6:
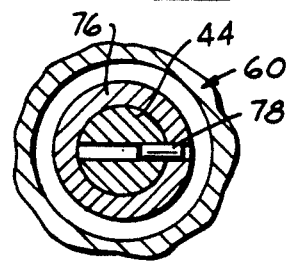
FIG. 6, a sectional view on line 6—6 of FIG. 3.
Figure 7:
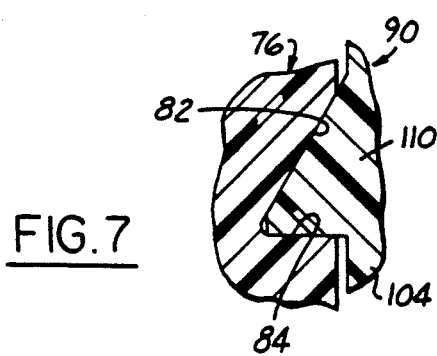
FIG. 7, an enlarged view of a thread on the valve actuator and control collar.

At the top of the valve housing 10 is a turret 60 bolted to the housing 10 by cap screws 62. A cap 64 surmounts the turret 60. An actuator plunger 70 has a manual top knob 72 with a screw shaft 74 threaded into the plunger 70. The plunger shaft 70 has a groove 71 to cooperate with a spring backed detent ball 73 to establish an up position. At the lower end of the plunger 70 is an enlarged cylindrical portion 76 with a central opening to receive the top projection 44 of the valve spool. A set screw or pin 78 (FIG. 6) secures the plunger 70 on the projection 44. The outer surface of the plunger portion 76 has a high pitch thread 80 extending in spiral fashion for the full length. This thread is a modified Acme thread illustrated in FIG. 7. One side of the thread, the upper side, is angled as a cam surface at 82, and the lower side 84 lies as a shoulder essentially in a plane perpendicular to the axis as shown in FIG. 7.

Figure 4:
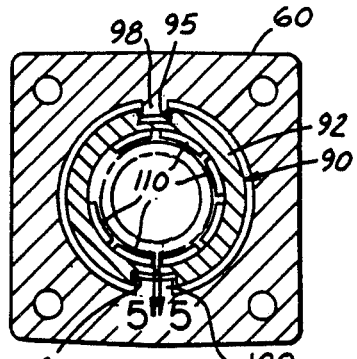
FIG. 4, a sectional view on line 4—4 of FIG. 3.
Figure 5:
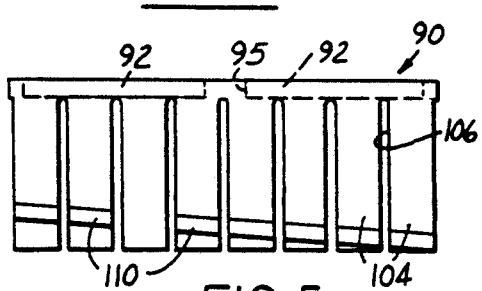
FIG. 5, an unwrapped view of the inner surface of a control bushing collar on line 5—5 of FIG. 4.

Within the body 60 outside the plunger 76 is a collar 90 having a top outer flange 92 which rests on a shoulder 94 within the turret 60. The flange 92 has notches 95, 96 to engage projections 98, 100 on the housing 60 to stabilize the collar against turning (FIG. 4). The notches 95, 96 are preferably of different widths to orient the threads properly and orient the proper positioning of bore 50 in the projection 40. Below the flange 92 is a cylindrical wall 102 formed of resilient fingers 104 spaced by slots 106. FIG. 5 (line 5—5 of FIG. 4) illustrates an unwrap view of the collar 90 with the flange 92 and the flexible fingers 104. The interior diameter of the collar 90 is dimensioned to have an easy slip fit with the plunger 76. On the inner surface of the collar are threads 110 having also a modified Acme shape as illustrated in FIG. 7 with registering cam surfaces 82 and shoulder surfaces 84.

The housing 10 and the valve spool 30 are preferably formed of a suitable metal such as steel or aluminum. The turret 60, cap 64, plunger 70, and collar 90 can be formed of high density plastic such as Delrin or Nylon. The collar 90 should be formed of a material such that the fingers 104 are resilient to function as will be described.

OPERATION OF THE DESCRIBED STRUCTURE

With the valve spool 30 in the position shown in FIG. 2, air from a pressure source can pass from port 14 to operational port 18 and thence to any controlled equipment. In this position, it is important that padlock bore 50 be located entirely within the housing 10 before controlling pressure is allowed to travel from pressure source port 14 to operational port 18. When the valve spool 30 is moved to the position shown in FIG. 3, port 14 is closed and ports 18 and 24 are connected between spool lands 34 and 36 to relieve any pressure in the system to atmosphere.

The movement of the valve spool to the relief position of FIG. 3 is accomplished by manual pressing down of the knob 72. This moves the detent ball 73 out of groove 71 and causes the threaded plunger element 76 to move downward in the collar 90. Since there are threads externally of element 76 and internally of collar 90, this movement can only be accomplished by the outward flexing of the fingers 104. The shape of the threads with the angled side at the top (FIG. 7) allows the camming outward of the fingers 104. With the valve spool in the FIG. 3 position, the bore 50 in projection 40 is exposed and the shackle 52 of padlock 54 can be applied a shown in FIG. 3. However, a similar axial return movement of the element 76 is prevented by the square shoulder side 84 of the engaged threads. Accordingly, the valve 30 can only be returned to the position of FIG. 2 by removing the padlock and turning the knob 72 to thread the plunger element 76 upward into the collar 90. This turning function will gradually move the valve spool back to the position of FIG. 2. Thus, the relief port 24 will be gradually closed and the pressure port 14 will be gradually opened. It is important, in the return movement of the spool, that the spool seal 36 close the port 24 before the spool seal 34 allows flow from pressure port 14 to operational port 18. This slow movement insures that a sudden shock pressure will not be delivered to the operational port 18 and the system being controlled and there will be a slow start-up. Once the valve spool is back to the position where detent 73 engages groove 71, the normal function will resume.

It will be appreciated that various size threads and varying thread pitches can be utilized as well as various sizes of valves without departing from the invention.

Figure 8:
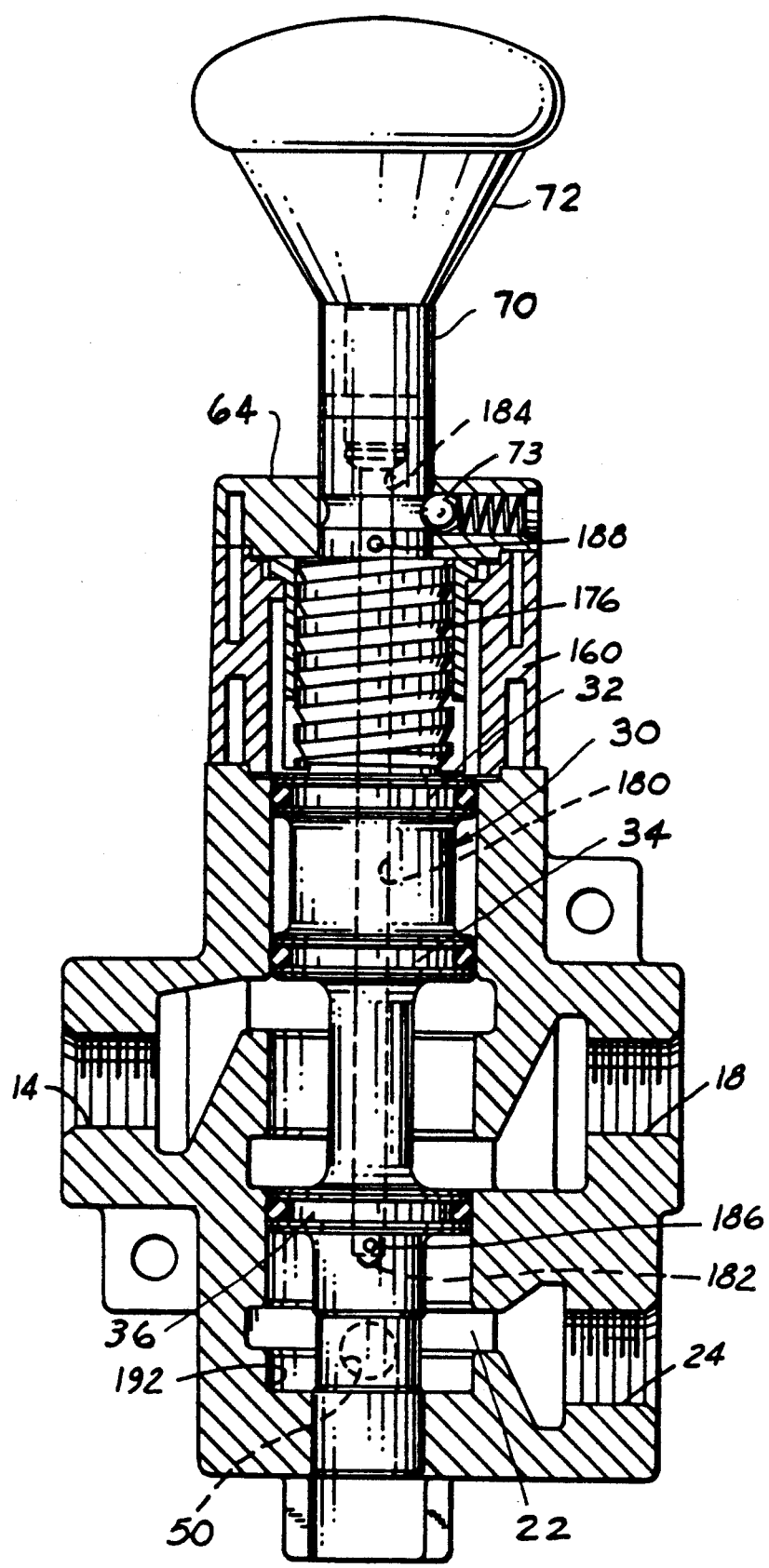
FIG. 8, a modification of the valve illustrated in FIGS. 1 to 7 with an axial relief passage to facilitate movement.

In FIG. 8, a modified structure is illustrated with the valve in the same position as in FIG. 2, that is, with the pressure port open to the operational port, and the exhaust port closed. The turret 60 of FIG. 2 is replaced by a modified turret 160 and the plunger element 176 on the plunger 70 has more threads than the plunger 76 of FIGS. 2 and 3.

In addition the valve spool 30 has an axial bore 180 which originates at 182 just below the sealing land 36 and continues upward into the plunger shaft terminating at 184 in plunger 70 just below the bore receiving the screw shaft 76 of the knob 72. At the lower end of the bore 182 is a cross-passage 186 in the valve spool 30 which is open in the position shown to the exhaust port groove 22 and the exhaust port 24. At the top of the center bore 180 is a cross-passage 188 in the plunger 70.

With the valve spool in the position shown in FIG. 8, the pressure port 14 is in communication with operational port 18 and port 24 is open to atmosphere. As the spool is moved downwardly by manual pressure on knob 72, operational pressure will start rushing past the spool land 36 and exerting some upward pressure on the spool. In addition, as the land 36 enters the bottom recess, some resistance is met. By porting at 186 into central passage 180, the pressure built up is relieved to remove the resistance that otherwise may exist While the upper end of the passage 180 is open through cross-passage 188 to the upper end of the valve and in a restricted way to atmosphere, nevertheless, a pressure build-up above the valve spool tends to balance out any resistance at the lower end. Accordingly, there is a smooth action of the valve. When the valve spool is fully seated, the cross-passage 186 is closed off.

In other respects, the operation of the valve is identical to that shown and described in FIGS. 1 to 7.

What is claimed is:

1. A fluid control valve comprising:
   (a) a valve housing having a pressure port, an operational port and an exhaust port,
   (b) a valve movable to connect a pressure port to said operational port in a first position and to connect said operational port to said exhaust port in a second position,
   (c) manually operable means to shift said valve respectively to said two positions, and
   (d) means associated with said valve and said manually operable means to effect rapid axial movement of said valve from said first position to said second position and to restrict movement of said valve from said second position to said first position.

2. A fluid control valve as in claim 1 in which said valve is a spool valve axially movable in said housing and said means comprises a plunger connected to said manually operable means for axial movement and connected to said valve spool, said plunger having threads formed on a first surface, a collar coaxial with said plunger having also threads on a second surface adjacent said first surface, said threads being shaped in cross-section to have registering cam surfaces and shoulder surfaces, said threads on one of said surfaces being mounted on flexible walls which will flex when said plunger and said collar are moved axially relative to each other, said shoulder surfaces preventing reverse axial motion and requiring a relative turning action to restore said valve to said first position.

3. A fluid control valve as defined in claim 1 in which said valve is an elongate spool valve having sealing lands to shift between a spaced pressure port, an operational port, and an exhaust port, and a central passage in said spool valve extending from a position below a first spool land to open and close said exhaust port to a position above second and third spool lands which close said pressure port, said passage being cross-ported at one end to be open to said exhaust port in a position closing said exhaust port, and open at the other end to a position above said second and third spool lands to vent pressure build up below said first land.

4. A fluid control valve comprising:

(a) a valve housing having an elongate bore with a pressure port, operational port and exhaust port, spaced along said bore,
(b) a valve spool in said bore axially shiftable to connect said pressure port and said operational port in a first position and to connect said operational port and said exhaust port in a second position,
(c) a turrret housing on said valve housing axially aligned with said bore,
(d) manually operable means in said turret housing operably associated with said valve spool,
(e) a plunger on said manually operable means having an annular surface with a first set of spiral threads,
(f) a collar in said turret coaxial with said plunger having a second set of spiral threads on a surface to engage said threads on said plunger,
(g) one of said sets of threads being mounted on flexible surfaces and said threads being of the Acme type with an angle cam surface on one side and a shoulder surface on the other whereby an axial motion on said manually operable means will move said plunger and said valve in an axial motion from a first position to a second position to allow one set of threads to move past the other set of threads, said threads locking a reverse axial motion and requiring a turning action of said manually operable means to retract said valve to said first position.

5. A fluid control valve as defined in claim 4 in which said collar is mounted in said turret housing having a wall surrounding said plunger and said collar has a plurality of flexible fingers forming said wall of said collar on which said second set of threads are located.

6. A fluid control valve as defined in claim 5 in which said valve has a projection to extend from said housing when said valve is in a closed position, a cross bore in said projection to receive a locking shackle, and means on said turret and means on said collar to engage to orient said collar circumferentially in said turret and to orient said valve for proper positioning of said shackle when the valve is in closed position.

* * * * *